2,772,970
Patented Dec. 4, 1956

2,772,970

METHOD OF MAKING FIBROUS SHEET MATERIAL CONTAINING A SYNTHETIC RUBBER BINDER

David A. Feigley, Jr., Manheim Township, Lancaster County, Pa., assignor to Armstrong Cork Company, Lancaster, Pa., a corporation of Pennsylvania No Drawing. Application April 4, 1952,
Serial No. 280,657

11 Claims. (Cl. 92—21)

This invention relates to a beater saturation process. More particularly, the invention relates to a process of producing saturated fibrous materials in which the fibers are dispersed in an aqueous slurry, a rubber latex is added, and a complex of a water-soluble aluminum salt and a water-soluble polycarboxylic acid is provided to coagulate the solids content of the latex onto the fibers as a binder.

Compositions containing fibrous material and binders such as rubber are produced in a number of ways. At the present time, probably the most widely employed method of producing such material is one which includes forming a sheet of fibrous material such as a kraft paper sheet on conventional papermaking equipment. This paper sheet is then passed through a bath containing a rubber latex, thereby coating and/or saturating the sheet to obtain the rubber-fiber composition. Another method which is employed includes coating a sheet prepared by conventional papermaking methods with a heavy paste containing rubber. The coating is normally applied by means of a doctor blade or similar applicator.

More recently there has been developed a process known as the "beater saturation process," which includes depositing the solids content of a rubber latex upon the fibers while contained in a slurry, and thereafter forming a sheet from the thus coated fibers by means of conventional papermaking techniques. This process offers numerous advantages over those discussed above, as improved physical properties may be obtained, such as high tensile strengths and the like, with lesser quantities of rubber than are employed in the processes wherein a sheet is first formed and then coated or saturated to produce the rubberized fiber composition in which the distribution of rubber will be perfectly even from one surface of the sheet to the other. In addition, the production of rubber-fiber compositions by the beater saturation technique may be practiced with fewer steps than the methods ordinarily employed. For instance, in the manufacture of paper it is necessary to form a slurry; and, when following the beater saturation method, the rubber is deposited on the fibers while in the form of a slurry, thereby eliminating the necessity of additional equipment which is required in the methods including the step of coating or saturating a sheet of fibrous material.

The beater saturation process broadly comprises forming an aqueous slurry of papermaking fibers, which may be either inorganic fibers such as asbestos or organic fibers such as kraft fibers, and adding to the resulting slurry a rubber latex which, in the early days of the practice of this process, was normally a natural rubber latex but which in more recent times has been any one of the synthetic rubber latices such as the product obtained by the emulsion polymerization of buatdiene and acrylonitrile, the product obtained by the emulsion polymerization of butadiene and styrene, the product obtained by the emulsion polymerization of chloroprene, and the like. The latex is then coagulated by addition of coagulating agents such as alum, mineral acids, and the like.

While considerable work has been done in the development of the beater saturation process and a certain amount of success has been realized in the production of rubber-fiber compositions containing a comparatively low proportion of binder such as rubber or resin, considerable difficulty has been experienced in attempting to produce material containing a high percentage of binder. The chief difficulty in the practice of this process, particularly when dealing with the production of material having a high percentage of binder, has been the inability to duplicate results. For instance, under one set of conditions there may be several sheets produced of the desired characteristics, and later in the same run using substantially identical conditions, sheets are produced having such a large difference in properties that they cannot be used for the same purposes as the sheets originally produced in the run. In fact, in some instances the fibers cannot be formed into a sheet.

Much thought has been given to the solution of these difficulties and various agents have been added to the slurry at various stages of the saturation process. For example, agents known as protectives for the latex have been added as it has been believed by many workers in the field that the variance in results is caused by too rapid precipitation of the latex, resulting in the production of comparatively large masses of rubber solids which fail to deposit on the fibers. The materials which have been so employed are well-known wetting agents, such as those polar compounds containing a characteristic sulfate, sulfonic, and/or sulfonate group. To mention all of these materials would require an unnecessary amount of space and, therefore, I shall mention only the more widely-known materials, such as sodium lauryl sulfate, sulfonated castor oil, aromatic sulfonates, sodium salts of sulfo succinic acids, isobutyl naphthalene sulfonate, the products obtained by condensing beta naphthalene sulfonic acid with isopropyl alcohol, and the like. Although improved results have been obtained by the use of such protective agents, there is still considerable difficulty experienced in duplicating the final material so as to obtain a uniform product.

It was also believed possible to improve on the results obtained by utilizing wetting and/or dispersing agents of the type described above by pretreatment of the fibrous material with polyvalent metal salts. There are many patents disclosing such a pretreatment and all of these generally show preference for the use of aluminum chloride. Here again, further improvement was experienced, but again the problem of producing uniform material was not solved.

I have found that the rubber latices employed as binders in the beater saturation process may be coagulated onto the fibers by providing in the slurry a reaction product of a water-soluble aluminum salt and a water-soluble polycarboxylic acid which functions as a coagulating agent and results in deposition of the solids content of the rubber latex onto the fibers in such a manner that the resulting slurry of coated fibers may be readily formed into a sheet.

While I do not intend to be limited by any theory expressed herein, the water-soluble aluminum salt apparently reacts with carboxylic acid groups to form a water-soluble complex having a low ionization constant. Thus, aluminum ions are supplied to the slurry at a definite low concentration that is maintained at a constant level during the entire coagulation, thereby coagulating the latex slowly to obtain even deposition upon the fibers.

The fibers which may be used in the practice of my invention may be papermaking fibers, such as cotton linters, kraft fibers, wool fibers, asbestos fibers, and mixtures of such fibers. From the above, it can be seen that the process may be used to produce sheet material from organic fibers and mineral fibers, as well as mixtures of such materials. If desired, finely-divided solids may be present in the slurry; for example, cork particles can be used to produce a resilient material composed of cork and fibrous materials. Such materials are particularly useful in the production of gaskets.

The binder used in the practice of my invention may be any of a number of synthetic rubbers. Typical of these materials are: the product known as GR-S, which is a copolymer of butadiene and styrene containing about 50% to 70% butadiene; Hycar, which is a copolymer of butadiene and acrylonitrile containing about 60% to 80% butadiene; and neoprene, which is a polymer of 2-chloro-butadiene-1,3. If desired, homopolymers of butadiene may be employed in the production of beater saturated materials, as well as homopolymers and/or copolymers of butadiene homologues, such as isoprene. These materials can be generically designated as synthetic rubbers, and more specifically designated as rubberlike polymers of butadiene, isoprene, and chloroprene, and rubberlike copolymers of butadiene or isoprene with copolymerizable vinyl compounds such as styrene and acrylonitrile. If desired, the rubberlike binders may be employed in conjunction with other binding material such as asphalt emulsions and the like.

The coagulating agents employed in the practice of my invention are complexes of aluminum salts and carboxylic acid radicals provided by water-soluble polycarboxylic acids. To obtain these coagulating agents, a water-soluble aluminum salt, such as aluminum chloride, aluminum sulfate, and the like, is reacted with a water-soluble polycarboxylic acid, such as dicarboxylic acid, for example, oxalic, maleic, malonic, succinic, glutaric, adipic, pimelic, tartaric and the like, and water-soluble tricarboxylic acids for example, citric acid and the like. In addition to the water-soluble polycarboxylic acids, water-soluble salts of such acids may be employed in producing the coagulating agent. Of course, the anhydrides of the acids may be used when they are available. Examples of water-soluble salts are the alkali metal salts such as sodium, potassium, and lithium salts, and the like. From the above it can be seen that the coagulating agents employed in the practice of my invention are reaction products of water-soluble aluminum salts and one of the group consisting of water-soluble polycarboxylic acids and salts thereof. As used herein, the term "polycarboxylic acid" is intended to embrace the anhydrides of the said acid.

The reaction between the aluminum and selected organic acid radical is a complex one, and apparently is not normal double decomposition. Therefore, these materials are referred to as complexes, as indicated above. To produce the desired results in accordance with the practice of my invention, the full masking effect of the organic acid radical seems to be obtained when about 0.6 of an equivalent weight is used for each equivalent weight of aluminum salts. Generally speaking, I prefer to employ at least 0.7 of an equivalent weight of polycarboxylic acid for each equivalent weight of aluminum salt in the production of the coagulating agent. Of course, higher quantities may be used, but have little additional masking effect.

The amount of water in the coagulating solution apparently has little if any effect on the action except to increase the total volume of solution necessary for complete coagulation as the dilution increases. Generally speaking, particularly advantageous results have been obtained when the solutions contain between about 10% and 15% solids concentration. One method of obtaining the coagulating agent is to prepare 10% solutions of alum and polycarboxylic acid and mix the two solutions in the desired ratio. Generally speaking, sufficient solution is provided in the slurry of fibers to yield about 2% to about 20% by weight of complex solids based on the weight of binder solids.

In accordance with one embodiment of my invention, the fibers, for example kraft paper fibers, are suspended in a slurry and a synthetic rubber latex, such as GR-S latex, is added thereto. After addition of the rubber latex, a solution of the reaction product of the water-soluble aluminum salt and the water-soluble polycarboxylic acid is added to the slurry of fibers and latex. Upon agitation of the resulting slurry, the rubber content of the latex is coagulated and deposited upon the fibers. The resulting slurry of coated fibers is then formed into a sheet on conventional papermaking equipment.

In another embodiment of my invention, the reaction product is formed in situ. In this embodiment, the slurry of fibers is formed and the aluminum salt is added to the slurry, followed by addition of the polycarboxylic acid or salt thereof. The resulting reaction product is formed substantially immediately, and after formation thereof the rubber latex is added. Upon agitation of the resulting slurry, the solids content of the latex is coagulated upon the fibers. The resulting slurry of coated fibers is then formed into a sheet in the usual manner.

My invention may be more readily understood by reference to the following specific examples, which are given by way of illustration and not by limitation.

*Example I*

75 parts by weight of rag fiber and 25 parts by weight of cork dust were mixed in 4,000 parts by weight of water with a high speed agitator. A mixture containing 39.5 parts by weight of GR-S No. 3 (butadiene-styrene rubberlike copolymer) and 25 parts by weight asphalt in the form of a mixture of the GR-S latex and asphalt emulsion was added to the slurry. Thereafter a 10% solution containing 10 parts by weight of a reaction product of aluminum sulfate and sodium citrate was added to the slurry, and upon agitation the solids content of the binder dispersion was deposited upon the fibers. The resulting slurry of coated fibers was then formed into a sheet on conventional equipment.

*Example II*

75 parts by weight of rag fiber and 25 parts by weight of cork dust were dispersed in 4,000 parts by weight of water. 3 parts by weight of a 10% solution of Tanol N (an alkyl aromatic sulfonate) were mixed with 79 parts by weight of a GR-S No. 3 latex containing 38% solids, and the resulting mixture added to the fiber slurry. 15 parts by weight of a 10% solution of the reaction product of aluminum sulfate and sodium citrate were added to the slurry, and upon agitation the solids content of the latex was completely coagulated onto the fibers. The resulting slurry of coated fibers was formed into a sheet.

*Example III*

75 parts by weight of rag fiber and 25 parts by weight of cork dust were dispersed in 4,000 parts by weight of water. 50 parts by weight of a 10% solution of a reaction product of aluminum sulfate and sodium citrate were added to the resulting slurry. A mixture containing 3 parts by weight of Tanol N (10% solution) and 79 parts by weight of a 38% solids GR-S No. 3 latex was added; the resulting slurry was agitated to deposit the rubber content of the latex onto the fiber. The slurry of coated fibers was formed into a sheet.

By varying the fibers, latices, and/or the proportions of the materials, I am able to produce sheet material having widely varied characteristics. The materials which may be produced in accordance with my invention may be used in a variety of applications. For example, they may be used in the manufacture of loom binder coverings and various parts for textile machines; as shoe leather, particularly soling material; in the preparation of molding compounds for the manufacture of washers, seals, brake linings, clutch facings, and the like; as cushioning material, for example, rug cushions, upholstery backing, panel board backing, and the like; as backing for linoleum and other floor and wall coverings; as gaskets; and as artificial leather, such as book covers, luggage, and the like.

I claim:

1. The method of making fibrous sheet material containing a synthetic rubber binder comprising forming a slurry containing papermaking fibers, a synthetic rubber latex, and about 2% to about 20% by weight based on said binder of a coagulating agent which is a water-soluble reaction product of relative proportions of about 1 equivalent weight of a water-soluble aluminum salt and at least about 0.6 equivalent weight of a compound selected from the group consisting of water-soluble alpha-omega, carbon chain, aliphatic polycarboxylic acids and water-soluble salts thereof, agitating the resulting slurry to coagulate the solids content of said latex onto said fibers, and forming the slurry of coated fibers into a sheet.

2. The method according to claim 1 wherein said latex comprises butadiene-acrylonitrile copolymer latex.

3. The method according to claim 1 wherein said latex comprises a synthetic rubber latex obtained by the emulsion polymerization of butadiene with styrene.

4. The method according to claim 1 wherein said latex comprises a synthetic rubber latex obtained by the emulsion polymerization of chloroprene.

5. The method according to claim 1 wherein said polycarboxylic acids comprise dicarboxylic acids.

6. The method according to claim 1 wherein said polycarboxylic acids comprise tricarboxylic acids.

7. The method of making fibrous sheet material containing a synthetic rubber binder comprising forming a slurry containing papermaking fibers, a synthetic rubber latex, and about 2% to about 20% by weight based on said binder of a coagulating agent which is a water-soluble reaction product of relative proportions of about 1 equivalent weight of a water-soluble aluminum salt and at least about 0.6 equivalent weight of sodium citrate, agitating the resulting slurry to coagulate the solids content of said latex onto said fibers, and forming the slurry of coated fibers into a sheet.

8. The method of making fibrous sheet material containing a synthetic rubber binder comprising forming a slurry containing papermaking fibers, a synthetic rubber latex, and about 2% to about 20% by weight based on said binder of a coagulating agent which is a water-soluble reaction product of relative proportions of about 1 equivalent weight of a water-soluble aluminum salt and at least about 0.6 equivalent weight of sodium tartrate, agitating the resulting slurry to coagulate the solids content of said latex onto said fibers, and forming the slurry of coated fibers into a sheet.

9. The method of making fibrous sheet material containing a synthetic rubber binder comprising forming a slurry containing papermaking fibers, adding to said slurry a butadiene-styrene copolymer latex, adding to the resulting slurry about 2% to about 20% by weight based on said latex of a coagulating agent which is a water-soluble reaction product of relative proportions of about 1 equivalent weight of aluminum sulfate and at least about 0.6 equivalent weight of sodium tartrate, agitating the resulting slurry, thereby causing the solids content of said latex to deposit onto said fibers, and forming the resulting slurry of coated fibers into a sheet.

10. The method of making fibrous sheet material containing a synthetic rubber binder comprising forming a slurry containing papermaking fibers, adding to said slurry a butadiene-styrene copolymer latex, adding to the resulting slurry about 2% to about 20% by weight based on said latex of a coagulating agent which is a water-soluble reaction product of relative proportions of about 1 equivalent weight of aluminum sulfate and at least about 0.6 equivalent weight of sodium citrate, agitating the resulting slurry, thereby causing the solids content of said latex to deposit onto said fibers, and forming the resulting slurry of coated fibers into a sheet.

11. The method of making fibrous sheet material containing a synthetic rubber binder comprising forming a slurry containing papermaking fibers, adding to said slurry a butadiene-acrylonitrile copolymer latex, adding to the resulting slurry about 2% to about 20% by weight based on said latex of a coagulating agent which is a water-soluble reaction product of relative proportions of about 1 equivalent weight of aluminum sulfate and at least about 0.6 equivalent weight of sodium citrate, agitating the resulting slurry, thereby causing the solids content of said latex to deposit onto said fibers, and forming the resulting slurry of coated fibers into a sheet.

References Cited in the file of this patent

UNITED STATES PATENTS

| | | |
|---|---|---|
| 1,567,646 | Hopkinson et al. | Dec. 29, 1925 |
| 2,315,675 | Trommsdorff | Apr. 6, 1943 |
| 2,474,801 | Owen | June 28, 1949 |
| 2,563,897 | Wilson et al. | Aug. 14, 1951 |
| 2,601,598 | Daniel et al. | June 24, 1952 |
| 2,613,190 | Feigley | Oct. 7, 1952 |
| 2,632,699 | Fowler et al. | Mar. 24, 1953 |
| 2,635,045 | Bixler | Apr. 14, 1953 |
| 2,657,991 | Walsh et al. | Nov. 3, 1953 |

FOREIGN PATENTS

| | | |
|---|---|---|
| 287,538 | Great Britain | July 12, 1928 |
| 895,568 | France | Jan. 29, 1945 |